US010871208B2

(12) United States Patent
Yoshida et al.

(10) Patent No.: US 10,871,208 B2
(45) Date of Patent: Dec. 22, 2020

(54) TENSIONER (71) Applicant: TSUBAKIMOTO CHAIN CO., Osaka (JP)

(72) Inventors: Osamu Yoshida, Osaka (JP); Masanori Watanabe, Osaka (JP); Yudai Takagi, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 305 days.

(21) Appl. No.: 16/148,508

(22) Filed: Oct. 1, 2018

(65) Prior Publication Data

US 2019/0107178 A1    Apr. 11, 2019

(30) Foreign Application Priority Data

Oct. 6, 2017 (JP) .................. 2017-195601

(51) Int. Cl.
*F16H 7/08* (2006.01)

(52) U.S. Cl.
CPC ... *F16H 7/0848* (2013.01); *F16H 2007/0806* (2013.01); *F16H 2007/0812* (2013.01); *F16H 2007/0859* (2013.01)

(58) Field of Classification Search
CPC ..... F16H 2007/0806; F16H 2007/0812; F16H 2007/0859
USPC ........................................ 474/110
See application file for complete search history.

(56) References Cited

U.S. PATENT DOCUMENTS

| 6,602,154 | B1* | 8/2003 | Guichard | ................. | F16H 7/08 |
| | | | | | 474/101 |
| 2008/0318717 | A1 | 12/2008 | Kurematsu | | |
| 2009/0209378 | A1* | 8/2009 | Kurematsu | .......... | F16H 7/0848 |
| | | | | | 474/110 |

(Continued)

FOREIGN PATENT DOCUMENTS

| JP | 2000-193052 A | 7/2000 |
| JP | 2009-2495 A | 1/2009 |

(Continued)

OTHER PUBLICATIONS

Office Action dated Jul. 14, 2020, issued in counterpart KR Application No. 10-2018-0115805, with English translation (9 pages).

*Primary Examiner* — Michael R Mansen
*Assistant Examiner* — Mark K Buse
(74) *Attorney, Agent, or Firm* — Westerman, Hattori, Daniels & Adrian (57) ABSTRACT

Provided is a tensioner with which efficiency of recirculation of oil can be improved and dependency on oil supplied from an oil pump or the like can be reduced. The tensioner includes a pressure adjustment mechanism, wherein the pressure adjustment mechanism includes a cylinder portion and a piston that is disposed in the cylinder portion so as to be capable of moving in a front-rear direction and that divides an interior space into an oil storage chamber and an adjustment space, and a liquid-tight state is maintained between the cylinder portion and the piston in all positions between a position of the piston where the piston has moved closest to the oil storage chamber side and a position of the piston where the piston has moved closest to the adjustment space side.

4 Claims, 8 Drawing Sheets

(56) References Cited

U.S. PATENT DOCUMENTS

| | | | | |
|---|---|---|---|---|
| 2012/0329590 A1* | 12/2012 | Yoshii | ............... | F16H 7/0848 |
| | | | | 474/110 |
| 2014/0187367 A1* | 7/2014 | Todd | .................. | F16H 7/0848 |
| | | | | 474/110 |
| 2015/0267789 A1* | 9/2015 | Kurematsu | ............ | F16H 7/08 |
| | | | | 474/110 |
| 2016/0305512 A1* | 10/2016 | Takagi | ............... | F16H 7/0836 |

FOREIGN PATENT DOCUMENTS

| | | |
|---|---|---|
| KR | 10-2009-0089252 A | 8/2009 |
| KR | 10-2015-0110331 A | 10/2015 |
| KR | 10-2015-0141183 A | 12/2015 |
| WO | 2014137790 A1 | 9/2014 |

\* cited by examiner

TENSIONER

BACKGROUND OF THE INVENTION

1. Field of the Invention

The present invention relates to a tensioner used to apply appropriate tension to a transmission belt or a transmission chain in a timing system of an engine or the like.

2. Description of the Related Art

A tensioner for maintaining a chain or the like at an appropriate tension is commonly used conventionally. For example, in a chain guide mechanism in which a tensioner lever guides a sliding motion of a transmission chain such as a roller chain that is wound endlessly around sprockets provided respectively on a crankshaft and a cam shaft in an engine room, for example, using a tensioner to bias the tensioner lever so that the tension remains appropriate is well-known technology.

Figure 7:
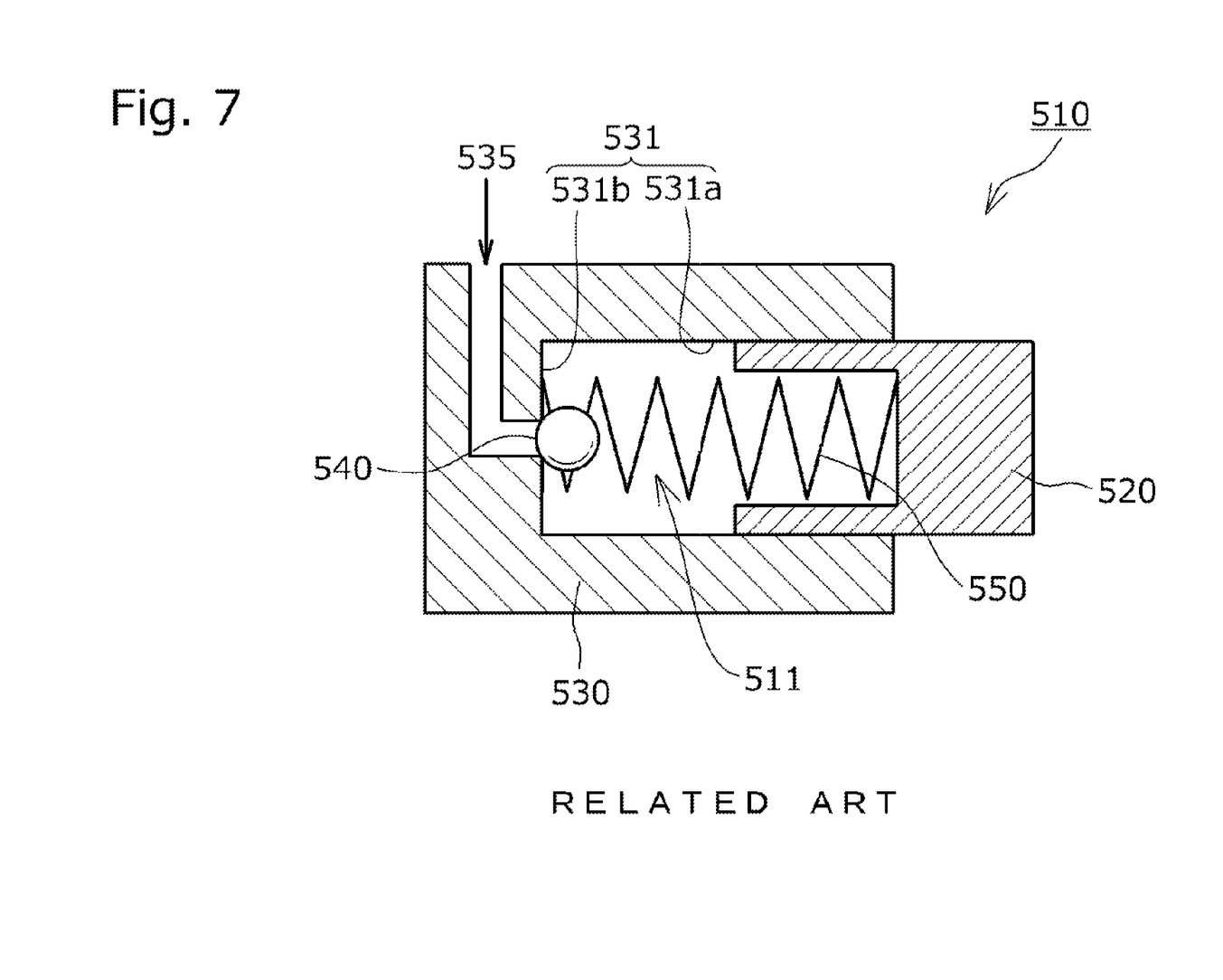
FIG. 7 is a schematic view of a tensioner according to the related art.

A conventional tensioner 510 used in a chain guide mechanism of this type, as illustrated schematically in FIG. 7, for example, includes a housing 530 having a cylindrical plunger housing hole 531 that is open at one end, a cylindrical plunger 520 inserted into the plunger housing hole 531 to be free to slide along a cylindrical surface 531a thereof, and a biasing unit for biasing the plunger 520 in a plunger projection direction. The biasing unit is constituted by a coil spring 550.

When oil is supplied through an oil supply hole 535 provided in the housing 530, a pressure oil chamber 511 formed between the plunger housing hole 531 and the plunger 520 is filled with the oil so that the plunger 520 is biased in the plunger projection direction by the oil while the oil is prevented from flowing out through the oil supply hole 535 by a check valve 540 (illustrated schematically in the figure as a check ball alone). Hence, as the plunger 520 reciprocates, the oil flows through a very small gap between the plunger 520 and the plunger housing hole 531, and due to flow resistance, a damping effect for damping the reciprocation of the plunger 520 is obtained.

With this conventional tensioner 510, when the tensioner 510 is left unused for a long time after the oil supply is stopped (in the case of an engine, after the engine is stopped), a time lag occurs with respect to the oil supply immediately after the tensioner 510 is next activated such that when the plunger 520 reciprocates, the oil in the pressure oil chamber 511 leaks out without being replaced by newly supplied oil. Accordingly, the oil in the pressure oil chamber 511 disappears such that no damping force is exerted on the plunger 520 by the oil, and as a result, the transmission chain may vibrate by a large amount, possibly causing noise and damage to the transmission chain.

Figure 8:
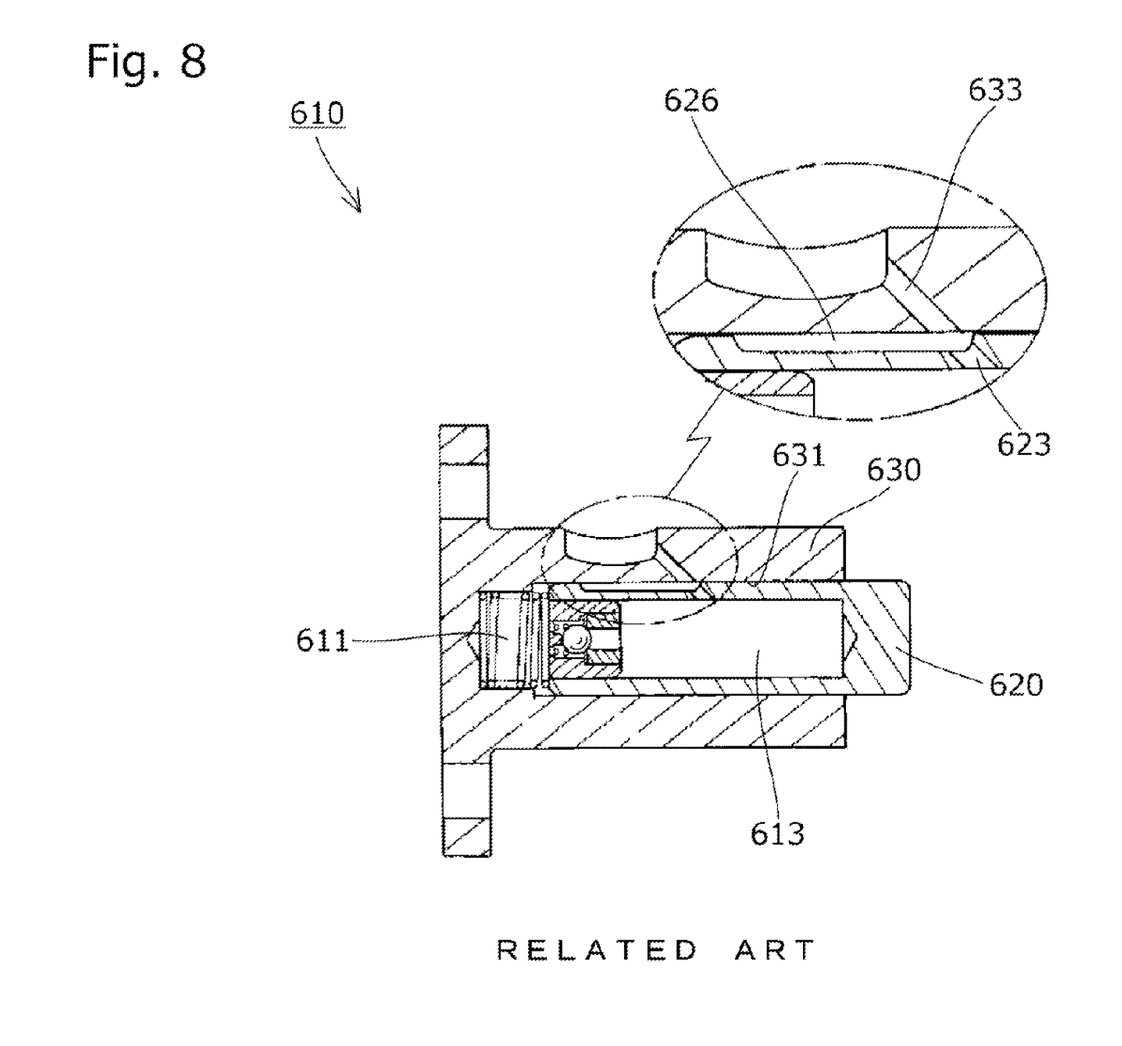
FIG. 8 is a sectional view of another tensioner according to the related art.

As shown in FIG. 8, a conventional tensioner 610 provided in response to this problem (see Japanese Patent Application Publication No. 2009-002495, for example) is structured such that an oil storage chamber 613 is provided in the interior of a plunger 620, whereby oil is supplied to a pressure oil chamber 611 from the oil storage chamber 613, and a fixed amount of oil is caused to remain in the oil storage chamber 613 without leaking out so that the oil remaining in the oil storage chamber 613 is supplied to the pressure oil chamber 611 immediately after activation following a long stoppage period. Thus, the damping force exerted on the plunger 620 by the oil is maintained, and as a result, vibration of the chain is suppressed such that damage to the chain is prevented.

As shown in FIG. 8, in the tensioner 610 described in Japanese Patent Application Publication No. 2009-002495, a housing oil supply hole 633 is formed in a housing 630 so as to penetrate from an outer wall side of the housing 630 to a plunger housing hole 631 side, a communication adjustment groove 626 is formed in an outer peripheral surface of the plunger 620 to provide an oil passage between an inner peripheral surface of the plunger housing hole 631 and an outer peripheral surface of the plunger 620, and a plunger oil supply hole 623 is formed in the plunger 620 so as to penetrate from the communication adjustment groove 626 side to the oil storage chamber 613 side of the plunger 620. As a result, oil is supplied from the outside of the housing 630 to the oil storage chamber 613 through the housing oil supply hole 633, the oil passage, and the plunger oil supply hole 623.

SUMMARY OF THE INVENTION

In the tensioner 610 described in Japanese Patent Application Publication No. 2009-002495, when oil pressure in the pressure oil chamber 611 increases, a part of the oil that leaks out of the pressure oil chamber 611 between the outer peripheral surface of the plunger 620 and the inner peripheral surface of the plunger housing hole 631 can be returned to the oil storage chamber 613 through the communication adjustment groove 626 and the plunger oil supply hole 623, but another part of the oil that leaks out of the pressure oil chamber 611 is discharged to an oil pump side through the housing oil supply hole 633, and therefore the oil in the tensioner 610 must be replenished to the fixed amount from the oil pump side. As a result, a problem occurs in that an oil supply pressure generated by the oil pump or the like must be designed to be high.

Further, the need to supply oil using an oil pump or the like may be eliminated by completely sealing the oil in the tensioner, as in a so-called auto-tensioner, but in an auto-tensioner, a problem exists in that a high-precision sealing mechanism must be provided to ensure that the oil does not leak out to the outside.

Hence, to solve the problems described above, an object of the present invention is to provide a tensioner with which efficiency of recirculation of oil in the tensioner can be improved and dependency on oil supplied from an oil pump or the like can be reduced, with a simple configuration without requiring a high-precision sealing mechanism.

The present invention solves the above problems by providing a tensioner including: a plunger having a plunger hole that is open on a rear side; a housing having a plunger housing hole that is open on a front side in order to house the plunger; a check valve that divides a space between the housing and the plunger into a pressure oil chamber and an interior space and allows oil to flow into the pressure oil chamber while preventing oil from flowing back into the interior space; a main biasing unit that is housed in the pressure oil chamber to be free to expand and contract and that biases the plunger toward the front side; an oil supply passage for supplying oil from an outside of the housing to an oil storage chamber in the interior space; and a pressure adjustment mechanism that adjusts an oil pressure in the oil storage chamber, wherein the oil supply passage includes a housing oil supply hole that penetrates from the outside of the housing to an inner peripheral surface of the plunger housing hole, a plunger oil supply hole that penetrates from an outer peripheral surface of the plunger to an inner peripheral surface of the plunger hole, and a communication adjustment groove formed in one or both of the inner peripheral surface of the plunger housing hole and the outer peripheral surface of the plunger, the pressure adjustment mechanism includes a cylinder portion and a piston that is disposed in the cylinder portion so as to be capable of moving in a front-rear direction and that divides the interior space into the oil storage chamber and an adjustment space, and a liquid-tight state is maintained between the cylinder portion and the piston in all positions between a position of the piston where the piston has moved closest to the oil storage chamber side and a position of the piston where the piston has moved closest to the adjustment space side.

According to the present invention, the pressure adjustment mechanism that adjusts the oil pressure in the oil storage chamber includes the cylinder portion and the piston that is disposed in the cylinder portion so as to be capable of moving in the front-rear direction and divides the interior space into the oil storage chamber and the adjustment space, and a liquid-tight state is maintained between the cylinder portion and the piston in all positions between the position of the piston where the piston has moved closest to the oil storage chamber side and the position of the piston where the piston has moved closest to the adjustment space side.

Hence, using inertia of the piston, the piston can be moved forward relative to the plunger when the plunger retreats and can be moved rearward relative to the plunger when the plunger advances, and using this operation of the piston, oil can be supplied to the oil storage chamber and the pressure oil chamber through the housing oil supply hole when the oil supply pressure of an oil pump or the like is designed to be low or the flow resistance of the housing oil supply hole is designed to be high, for example when a diameter of the housing oil supply hole is designed to be small.

By designing the flow resistance of the housing oil supply hole to be high, therefore, the majority of the oil that leaks out of the pressure oil chamber between the outer peripheral surface of the plunger and the inner peripheral surface of the plunger housing hole when the oil pressure in the pressure oil chamber increases can be returned to the oil storage chamber through the communication adjustment groove and the plunger oil supply hole. As a result, the efficiency of recirculation of oil in the tensioner can be improved, and the oil supply pressure of the oil pump or the like can be designed to be low.

Accordingly, reductions in oil consumption and the power of an oil pressure generation source such as the oil pump can be achieved, and dependency on the oil supplied from the oil pump or the like can also be reduced. As a result, effects of the type, temperature, amount, and so on of the oil supplied from the oil pump or the like can be reduced, and a chain holding force can be stabilized.

Furthermore, in the case of a so-called auto tensioner, in which oil is completed sealed within the tensioner, a high-precision sealing mechanism must be provided to ensure that the oil does not leak out to the outside, but according to the present invention, the oil can be replenished from the outside of the tensioner, and therefore a high-precision sealing mechanism is not required, enabling a reduction in cost.

DESCRIPTION OF THE PREFERRED EMBODIMENT

A tensioner 10 according to an embodiment of the present invention will be described below on the basis of the figures.

Figure 1:
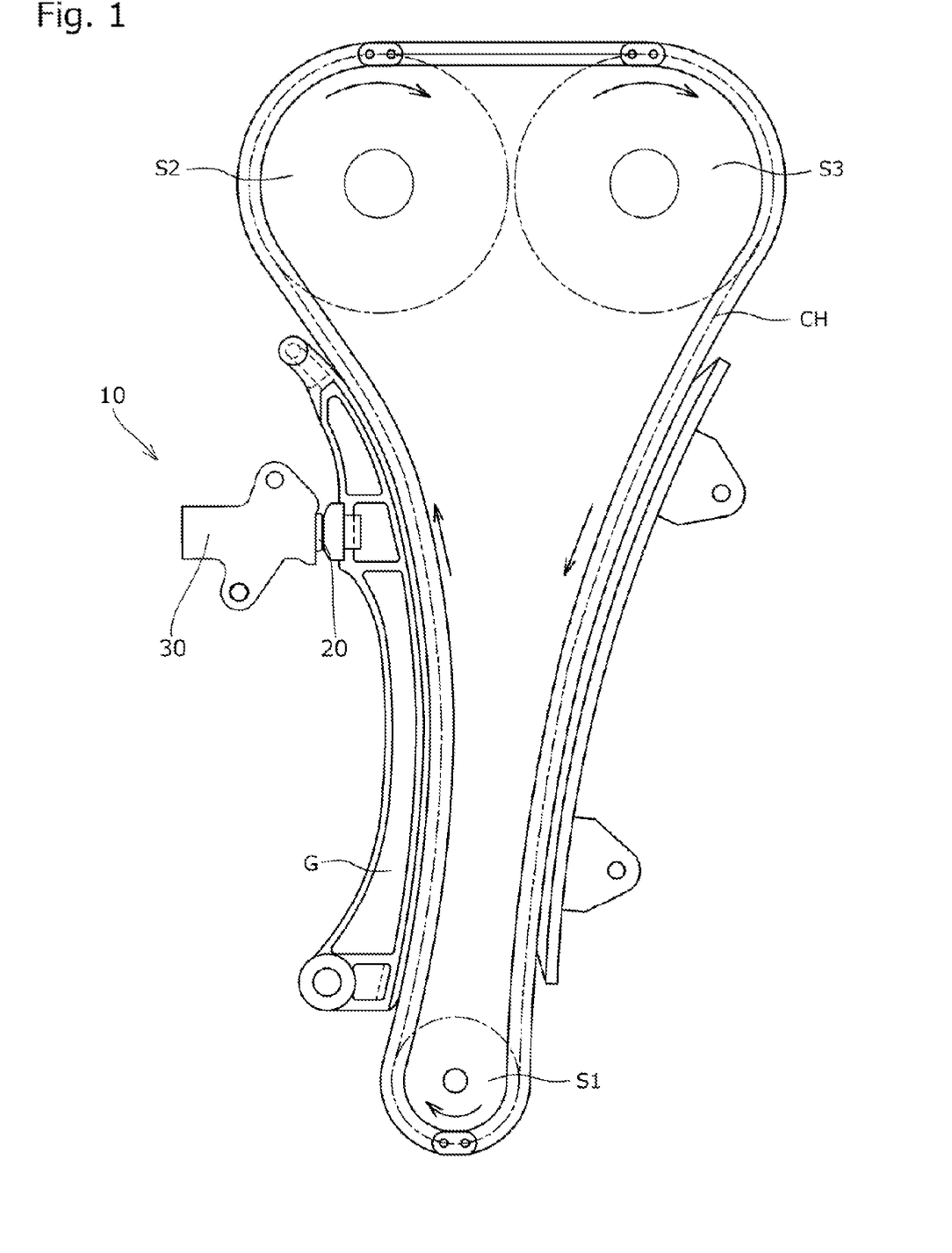
FIG. 1 is an illustrative view showing a manner of use of a tensioner according to an embodiment of the present invention.

First, as shown in FIG. 1, the tensioner 10 according to this embodiment is incorporated into a chain transmission device used in a timing system of an automobile engine or the like, and is attached to an engine block (not shown) in order to apply appropriate tension, via a tensioner lever G, to a slack side of a transmission chain CH wound around a plurality of sprockets S1 to S3, thereby suppressing vibration of the transmission chain CH during travel.

Figure 2:
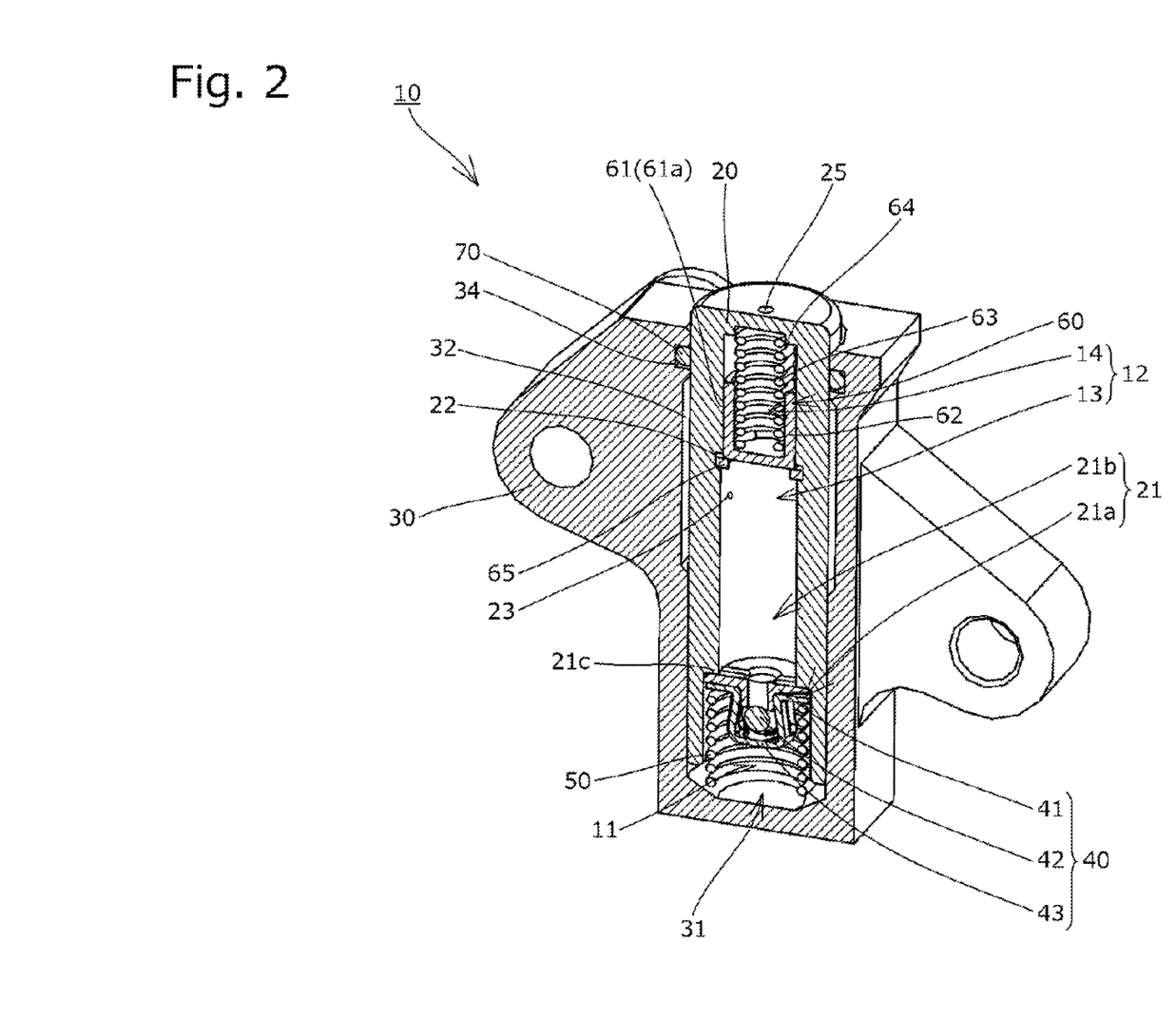
FIG. 2 is a sectional perspective view of the tensioner.

As shown in FIG. 2, the tensioner 10 includes a plunger 20 having a cylindrical plunger hole 21 that is open on a rear side, a housing 30 having a plunger housing hole 31 in which the plunger 20 is housed, a check valve 40 that divides a space between the housing 30 and the plunger 20 into a front side interior space 12 and a rear side pressure oil chamber 11 and allows oil to flow into the pressure oil chamber 11 while preventing oil from flowing back into the interior space 12, a coil spring (a main biasing unit) 50 housed in the pressure oil chamber 11 to be free to expand and contract so as to bias the plunger 20 toward the front side, an oil supply passage for supplying oil from the outside of the housing 30 to an oil storage chamber 13 in the interior space 12, a pressure adjustment mechanism 60 that adjusts the oil pressure in the oil storage chamber 13, and a sealing member 70 for forming a seal between an outer peripheral surface of the plunger 20 and an inner peripheral surface of the plunger housing hole 31.

The constituent elements of the tensioner 10 will each be described below on the basis of the figures.

The plunger 20 is formed from a metal such as iron in the shape of a cylinder having a closed bottom, and as shown in FIG. 2, is inserted into the plunger housing hole 31 to be free to advance and retreat in a front-rear direction.

As shown in FIG. 2, the plunger hole 21 in the plunger 20 includes a rear side large diameter hole 21a, a front side small diameter hole 21b that is connected to the front side of the large diameter hole 21a and formed coaxially therewith, and a step portion 21c formed between the large diameter hole 21a and the small diameter hole 21b.

As shown in FIG. 2, an annular groove 22 is formed in an inner peripheral surface of the small diameter hole 21b. The annular groove 22 functions as a site in which to dispose a movement restricting member 65, to be described below.

Further, the inner peripheral surface of a part of the small diameter hole 21b on the front side of the annular groove 22 functions as a cylinder portion 61 in which to dispose a piston 62 forming the pressure adjustment mechanism 60.

Furthermore, the step portion 21c functions as a site for restricting movement of the check valve 40 toward the interior space 12 side.

Further, a plunger oil supply hole 23 is formed in the plunger 20 so as to penetrate from the outer peripheral surface of the plunger 20 to the inner peripheral surface of the small diameter hole 21b (the oil storage chamber 13).

Furthermore, a recessed portion 24 is formed in an inner surface (a lower surface) of a bottom portion (a front end portion) of the plunger 20, and an external relief hole 25 is formed in the bottom portion (the front end portion) of the plunger 20 to connect an adjustment space 14 to the outside of the plunger 20.

Note that the external relief hole 25 is preferably provided in order to discharge air that has entered the oil storage chamber 13 and the adjustment space 14 to the outside, and by providing the external relief hole 25, air in the oil storage chamber 13 can be discharged instantaneously through the external relief hole 25 during engine startup in particular, with the result that a further reduction in startup noise can be achieved.

Figure 3:
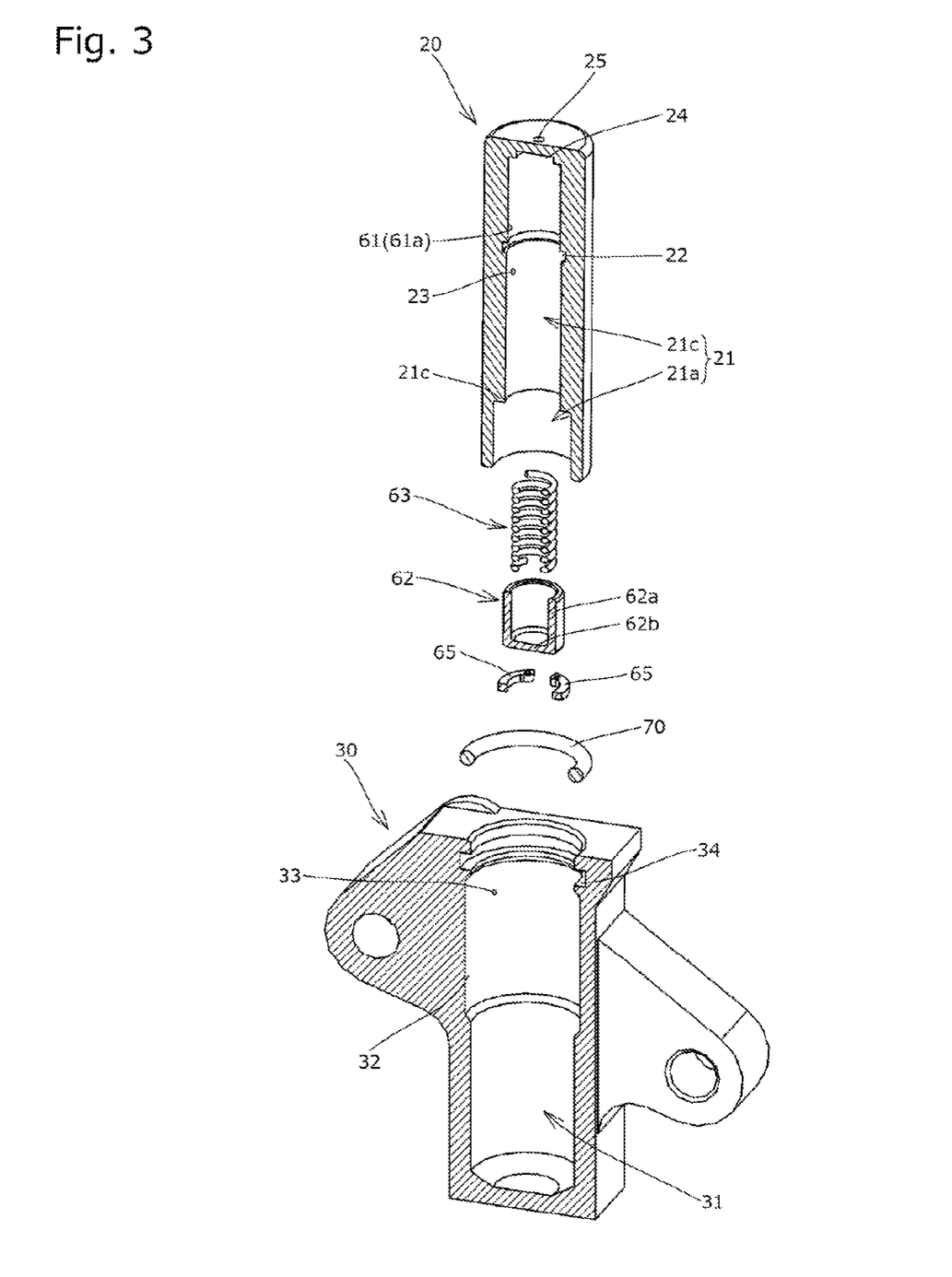
FIG. 3 is a sectional perspective view of components forming parts of the tensioner.

The housing 30 is formed from a metal such as an aluminum alloy, synthetic resin, or the like, and as shown in FIGS. 2 and 3, includes a communication adjustment groove 32 formed in an annular shape in the inner peripheral surface of the plunger housing hole 31, a housing oil supply hole 33 that penetrates from the outside of the housing 30 to the inner peripheral surface of the plunger housing hole 31 in order to supply oil to the communication adjustment groove 32, and an annular groove 34 formed in the inner peripheral surface of the plunger housing hole 31 on the front side of the communication adjustment groove 32 in order to dispose the sealing member 70 therein.

The plunger oil supply hole 23 and the housing oil supply hole 33 are formed such that a flow resistance of the housing oil supply hole 33 is larger than a flow resistance of the plunger oil supply hole 23, and in this embodiment, a sectional area (a diameter dimension) of the housing oil supply hole 33 is designed to be smaller than a sectional area (a diameter dimension) of the plunger oil supply hole 23.

Figure 6:
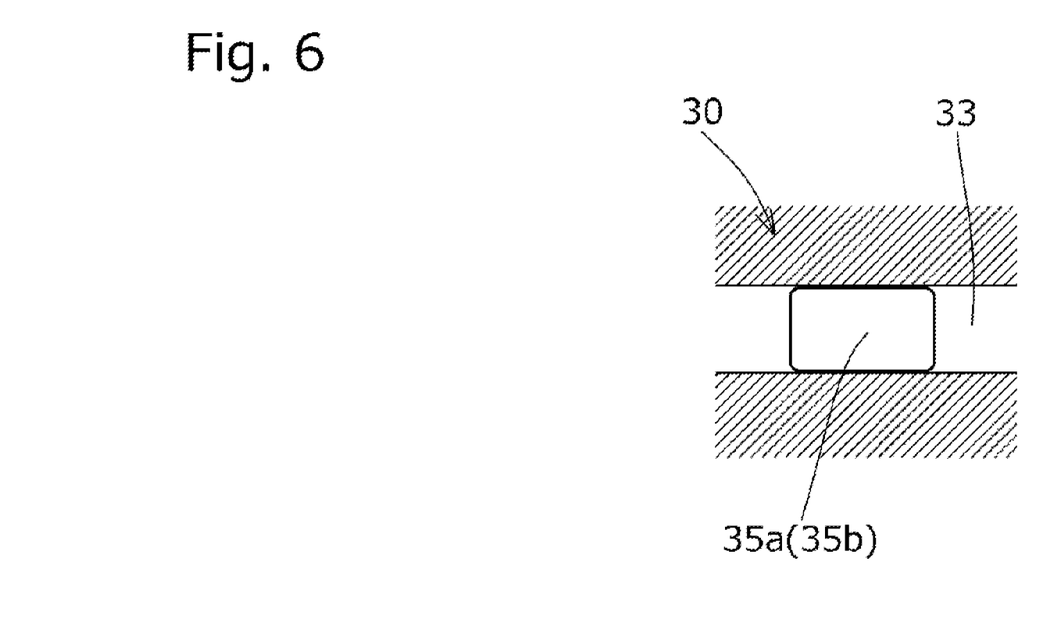
FIG. 6 is an illustrative view showing a modified example in which an orifice or a check valve is disposed in a housing oil supply hole.

Note that instead of designing the sectional area (the diameter dimension) of the housing oil supply hole 33 to be smaller, an orifice 35a for increasing the flow resistance of the oil or a check valve 35b for preventing the oil from flowing out to the outside of the housing 30 while allowing oil to flow in from the outside of the housing 30 may be disposed in the housing oil supply hole 33, as shown in FIG. 6.

Alternatively, the orifice 35a and the check valve 35b may both be disposed in the housing oil supply hole 33.

As shown in FIGS. 2 and 3, an oil supply passage is formed by the plunger oil supply hole 23, the housing oil supply hole 33, and the communication adjustment groove 32.

Note that the communication adjustment groove 32 may be formed in one or both of the outer peripheral surface of the plunger 20 and the inner peripheral surface of the plunger housing hole 31.

As shown in FIGS. 2 and 3, the coil spring 50 is disposed such that one end (a front end) thereof contacts the check valve 40 (a flange portion of a retainer 43) and the other end (a rear end) thereof contacts a bottom portion of the plunger housing hole 31.

As shown in FIGS. 2 and 3, the coil spring 50 biases the plunger 20 toward the front side and pushes the check valve 40 (the retainer 43 and a seat member 41) against the step portion 21c so that the check valve 40 is secured within the large diameter hole 21a.

The check valve 40 is disposed in (a front side part of) the large diameter hole 21a, and as shown in FIGS. 2 and 3, includes the seat member 41, a spherical valve member 42, the retainer 43 for restricting movement of the valve member 42, and a spring (not shown) disposed between the valve member 42 and the retainer 43.

Note that as regards a specific configuration of the check valve 40, the check valve 40 may be configured as desired as long as the check valve 40 allows oil to flow into the pressure oil chamber 11 and prevents oil from flowing back into the interior space 12 (the oil storage chamber 13). For example, a spring for biasing the valve member 42 toward the seat member 41 side may be disposed between the valve member 42 and the retainer 43.

Further, the respective constituent members of the check valve 40 are formed from metal, synthetic resin, or the like.

Figure 4:
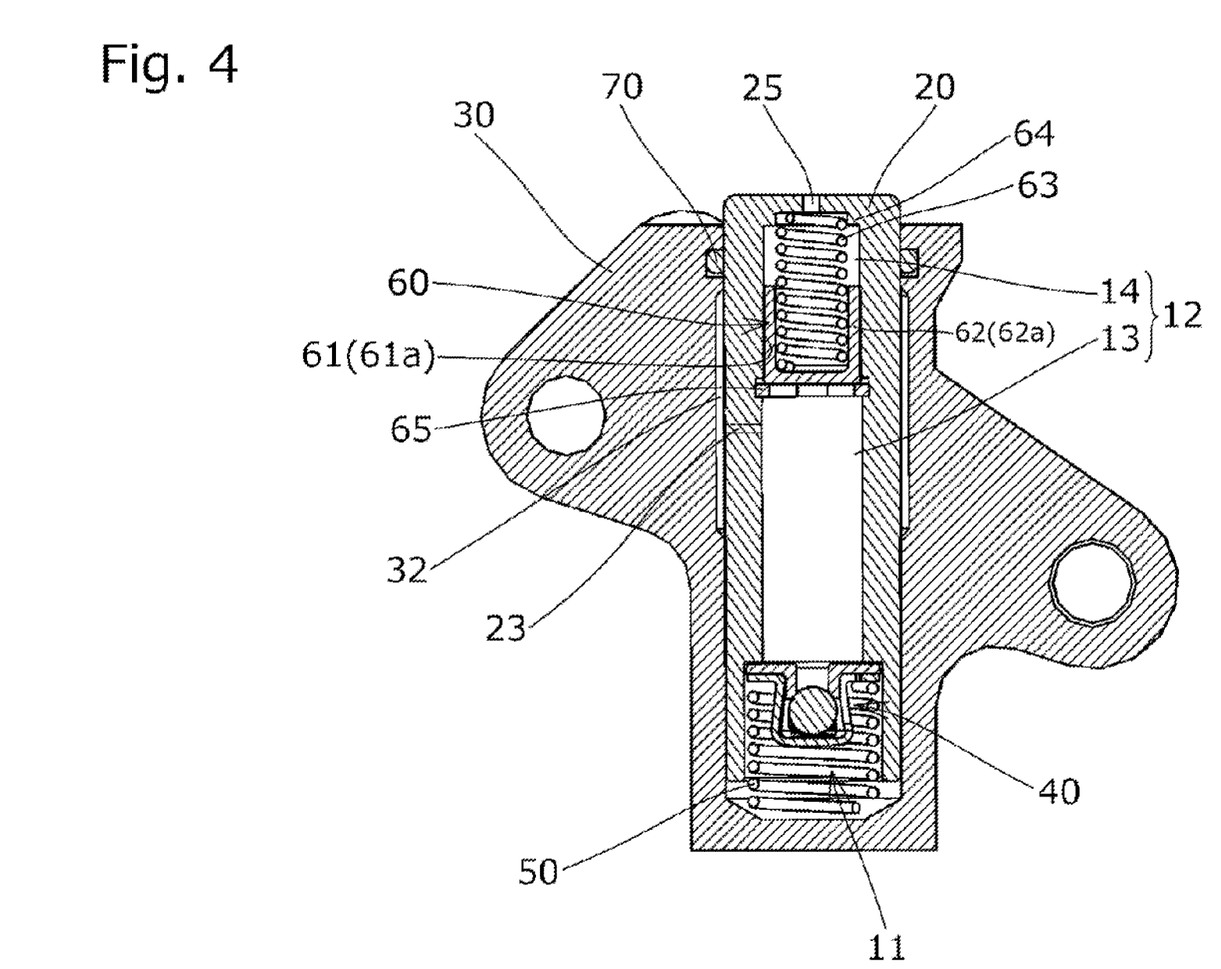
FIG. 4 is a sectional view showing the tensioner in a normal condition.

The pressure adjustment mechanism 60 is used to adjust the oil pressure in the oil storage chamber 13, and as shown in FIGS. 2 to 4, includes the cylinder portion 61, which has a cylindrical cylinder inner peripheral surface 61a, the piston 62, which is disposed inside the cylinder portion 61 so as to be capable of moving in the front-rear direction, and divides the interior space 12 into the oil storage chamber 13 and the adjustment space 14, a piston biasing unit 63 for biasing the piston 62 toward the oil storage chamber 13 side, a first restricting portion 64 for restricting movement of the piston 62 toward the adjustment space 14 side (the front side), and a second restricting portion 65 for restricting movement of the piston 62 toward the oil storage chamber 13 side (the rear side).

The cylinder portion 61 is a site inside which (at least a part of) the piston 62 is disposed so as to be capable of sliding in the front-rear direction.

In this embodiment, as shown in FIGS. 2 and 3, a part of the plunger 20 in the front-rear direction, or more specifically, an inner peripheral wall of the small diameter hole 21b of the plunger 20, functions as the cylinder portion 61 (the cylinder inner peripheral surface 61a).

As shown in FIGS. 2 and 3, the piston biasing unit 63 is constituted by a coil spring 63.

As shown in FIGS. 2 and 3, the coil spring 63 is disposed in the adjustment space 14 such that one end (a rear end) thereof is provided within the piston 62 and the other end (a front end) thereof is disposed in the recessed portion 24 formed in the bottom portion of the plunger 20.

The first restricting portion 64 is disposed on the adjustment space 14 side (the front side) of the piston 62 in order to restrict movement of the piston 62 toward the adjustment space 14 side (the front side). In this embodiment, as shown in FIGS. 2 and 3, the bottom portion of the plunger 20 functions as the first restricting portion 64.

The second restricting portion 65 is disposed on the oil storage chamber 13 side (the rear side) of the piston 62 in order to restrict movement of the piston 62 toward the oil storage chamber 13 side (the rear side).

A plurality of (two) movement restricting members 65 set in the annular groove 22 formed in the plunger 20 function as the second restricting portion 65.

Note that as long as the movement restricting member 65 restricts movement of the piston 62 toward the oil storage chamber 13 side (the rear side), the specific form (the number, shape, and so on) thereof may be set as desired.

As shown in FIG. 3, the piston 62 is constituted by a single member that is made of synthetic resin, metal, or the like and includes a tubular (cylindrical) piston body portion 62a disposed in the cylinder portion 61, and a bottom portion 62b formed on one end of the piston body portion 62a on the oil storage chamber 13 side (the rear side).

As shown in FIGS. 2 and 3, the piston body portion 62a is disposed in the cylinder portion 61 (the small diameter hole 21b).

A difference in diameter between the cylinder inner peripheral surface 61a and an outer peripheral surface (a piston outer peripheral surface) of the piston body portion 62a is small enough to ensure that a liquid-tight state is maintained between the cylinder inner peripheral surface 61a and the outer peripheral surface of the piston body portion 62a. As a result, oil can be prevented from escaping and flowing out between the cylinder inner peripheral surface 61a and the outer peripheral surface of the piston body portion 62a.

Figure 5:
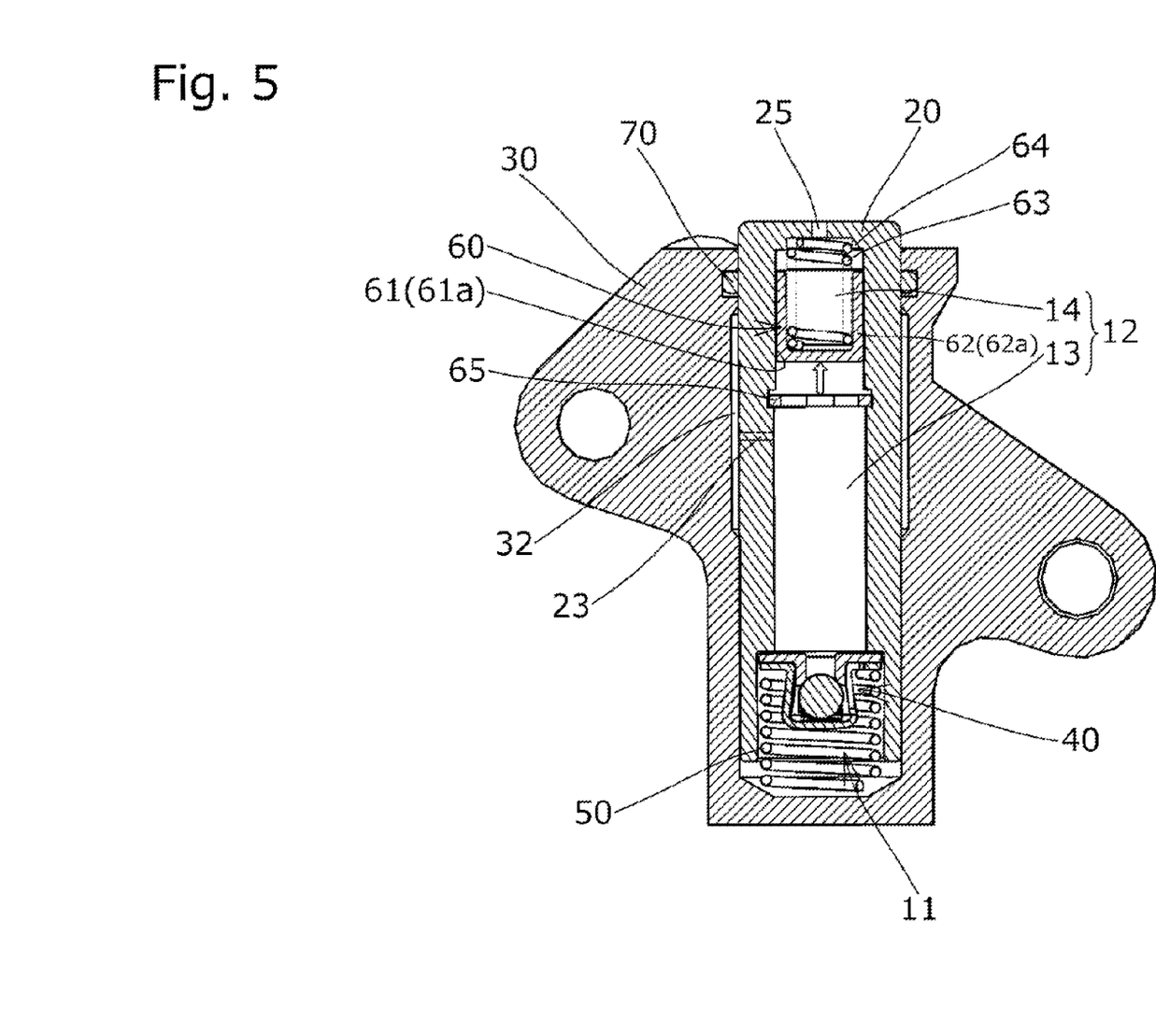
FIG. 5 is a sectional view showing a state in which the piston has moved forward.

As shown in FIGS. 4 and 5, a liquid-tight state is maintained between the cylinder portion 61 and the piston 62 in all positions from a position of the piston 62 after moving as far as possible to the oil storage chamber 13 side (a position in which movement is restricted by the second restricting portion 65) to a position of the piston 62 after moving as far as possible to the adjustment space 14 side. In other words, the liquid-tight state is maintained between the cylinder portion 61 and the piston 62 in all positions between the position of the piston 62 where the piston 62 has moved closest to the oil storage chamber 13 side and the position of the piston 62 where the piston 62 has moved closest to the adjustment space 14 side. More specifically, a liquid-tight state is maintained between the cylinder inner peripheral surface 61a and the outer peripheral surface of the piston body portion 62a.

The sealing member 70 is constituted by an O ring formed from synthetic rubber or the like, and as shown in FIG. 2, is disposed between the outer peripheral surface of the plunger 20 and the inner peripheral surface of the plunger housing hole 31. In this embodiment, the sealing member 70 is disposed in the annular groove 34 formed in the housing 30 in order to form a seal between the outer peripheral surface of the plunger 20 and the inner peripheral surface of the plunger housing hole 31.

An embodiment of the present invention was described in detail above, but the present invention is not limited to the above embodiment, and various design modifications may be executed thereon without departing from the present invention as described in the claims.

For example, in the above embodiment, the tensioner is incorporated into the timing system of an automobile engine, but the specific application of the tensioner is not limited thereto.

Further, in the above embodiment, the tensioner applies tension to the transmission chain via a tensioner lever, but instead, tension may be applied to the transmission chain by guiding the sliding motion of the transmission chain directly using a tip end of the plunger.

Furthermore, the present invention is not limited to a transmission mechanism using a transmission chain, and may be applied to a similar transmission mechanism using a belt, a rope, or the like. The present invention can be used in various industrial fields in any application requiring that tension be applied to an elongated article.

Moreover, in the above embodiment, the housing that houses the plunger is a so-called tensioner body attached to an engine block or the like, but the specific form of the housing is not limited to that described above, and a cylindrical so-called sleeve inserted into a body hole formed in the tensioner body may be used instead.

Furthermore, in the above embodiment, a liquid-tight state is maintained between the cylinder inner peripheral surface and the outer peripheral surface of the piston body portion by making the difference between the respective diameter dimensions of the cylinder inner peripheral surface and the outer peripheral surface of the piston body portion (a piston outer peripheral surface) very small, but the method used to maintain the liquid-tight state is not limited to the above method, and instead, for example, a member such as packing for maintaining a liquid-tight state may be disposed between the cylinder inner peripheral surface and the outer peripheral surface of the piston body portion.

Note that the term "liquid-tight state" as used in this specification is not limited to a state in which oil is completely prevented from flowing between the cylinder inner peripheral surface and the outer peripheral surface of the piston body portion (the piston outer peripheral surface), and also denotes a state in which only a very small amount of oil flows between the cylinder inner peripheral surface and the outer peripheral surface of the piston body portion.

Further, in the above embodiment, the annular groove in which the sealing member is disposed is formed in the housing, but the annular groove for disposing the sealing member may be formed in one or both of the inner peripheral surface of the plunger housing hole and the outer peripheral surface of the plunger.

Moreover, in the above embodiment, the piston is formed from a single member, but the specific form of the piston is not limited thereto, and instead, for example, the piston may be formed by combining a plurality of members.

Furthermore, in the above embodiment, movement of the piston toward the adjustment space side is restricted by providing the first restricting portion, but instead of providing the first restricting portion, the position of the piston may be controlled by adjusting a biasing force of the piston biasing unit.

What is claimed is:

1. A tensioner comprising:
   a plunger having a plunger hole that is open on a rear side;
   a housing having a plunger housing hole that is open on a front side in order to house the plunger;
   a check valve that divides a space between the housing and the plunger into a pressure oil chamber and an interior space and allows oil to flow into the pressure oil chamber while preventing oil from flowing back into the interior space;
   a main biasing unit that is housed in the pressure oil chamber to be free to expand and contract and that biases the plunger toward the front side;
   an oil supply passage for supplying oil from an outside of the housing to an oil storage chamber in the interior space; and
   a pressure adjustment mechanism that adjusts an oil pressure in the oil storage chamber, wherein
   the oil supply passage includes a housing oil supply hole that penetrates from the outside of the housing to an inner peripheral surface of the plunger housing hole, a plunger oil supply hole that penetrates from an outer peripheral surface of the plunger to an inner peripheral surface of the plunger hole, and a communication adjustment groove formed in one or both of the inner peripheral surface of the plunger housing hole and the outer peripheral surface of the plunger,
   the pressure adjustment mechanism includes a cylinder portion and a piston that is disposed in the cylinder portion so as to be capable of moving in a front-rear direction and that divides the interior space into the oil storage chamber and an adjustment space, and a liquid-tight state is maintained between the cylinder portion and the piston in all positions between a position of the piston where the piston has moved closest to the oil storage chamber side and a position of the piston where the piston has moved closest to the adjustment space side.

2. The tensioner according to claim 1, further comprising a sealing member disposed between the outer peripheral surface of the plunger and the inner peripheral surface of the plunger housing hole, on a front side of the housing oil supply hole, the plunger oil supply hole, and the communication adjustment groove.

3. The tensioner according to claim 1, wherein the plunger oil supply hole and the housing oil supply hole are formed such that a flow resistance of the housing oil supply hole is larger than a flow resistance of the plunger oil supply hole.

4. The tensioner according to claim 1, wherein one or both of an orifice and a check valve that prevents oil from flowing out to the outside of the housing while allowing oil to flow in from the outside of the housing is disposed in the housing oil supply hole.

* * * * *